Figure 1:
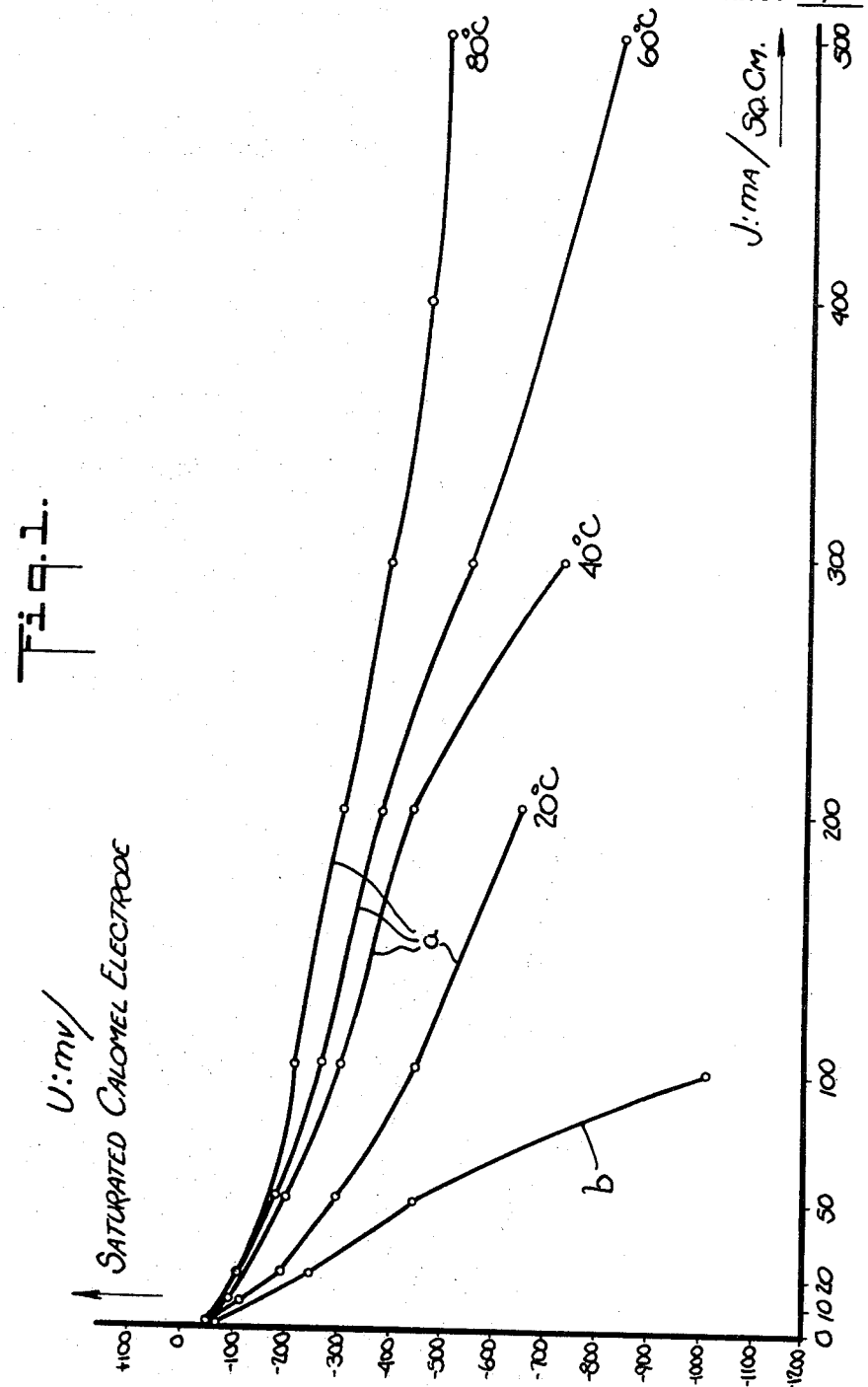

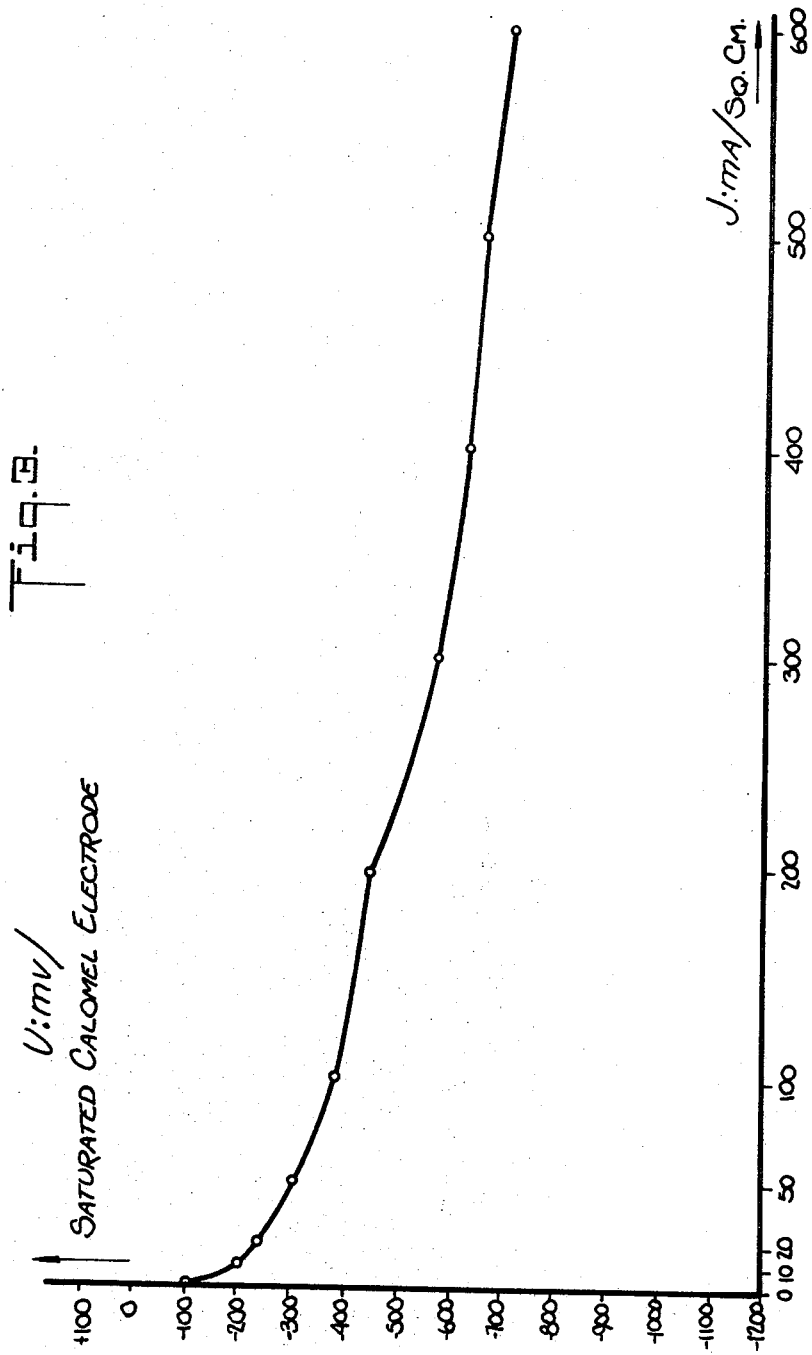

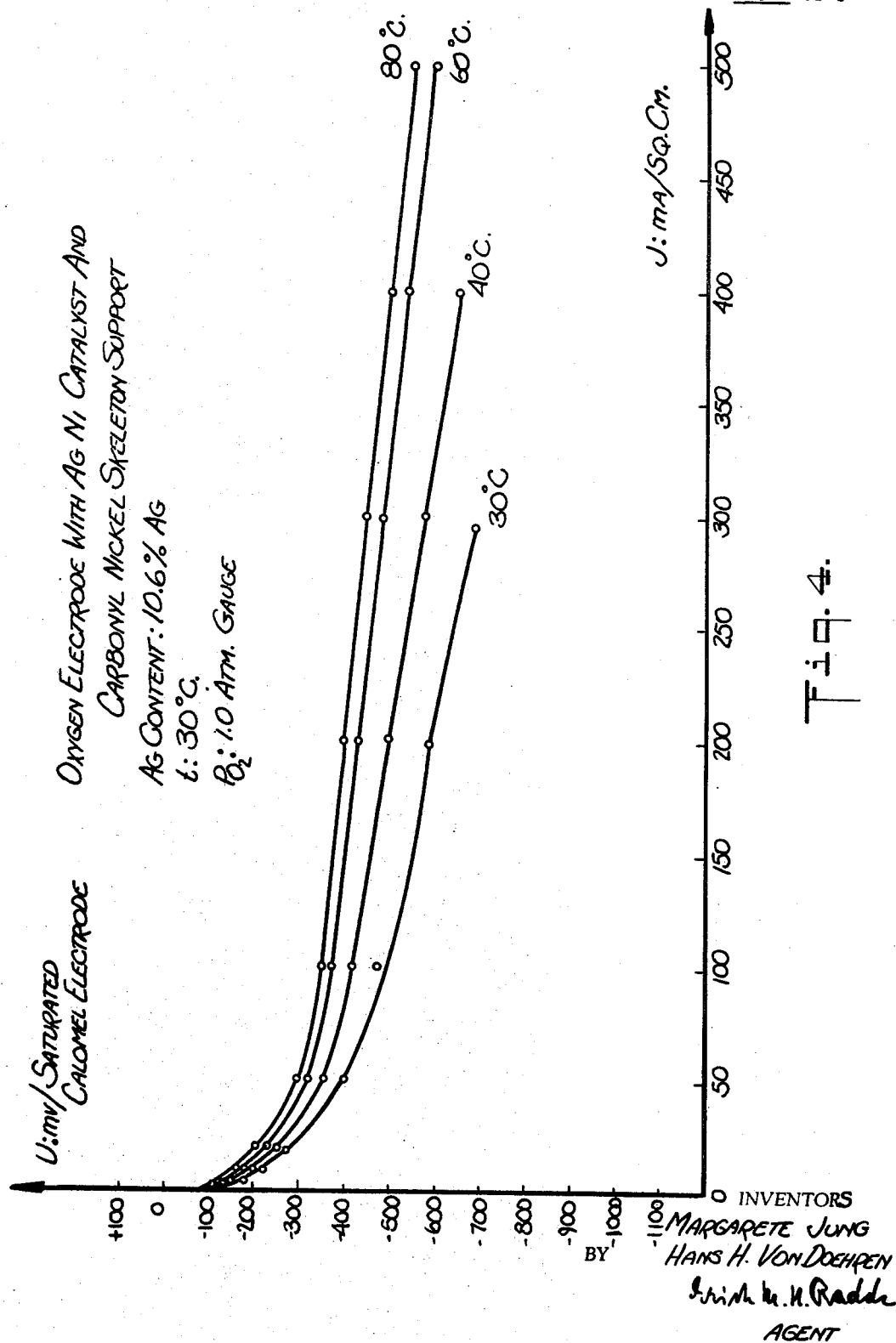

3,419,437
METALLIC CATALYST ELECTRODE AND METHOD OF ITS MANUFACTURE
Margarete Jung, Nieder-Eschbach im Taunus, and Hans H. von Doehren, Frankfurt am Main, Germany, assignors to Varta Aktiengesellschaft, Frankfurt am Main, Germany, a corporation of Germany
Filed July 20, 1964, Ser. No. 383,609
Claims priority, application Germany, July 18, 1963, V 24,328
12 Claims. (Cl. 136—120)

The present invention relates to improvements in porous, highly active electrodes and to improved methods for their manufacture. It is more particularly concerned with the production of electrodes which contain at least two catalytically active metals and which are useful for electrochemical devices, especially for fuel cell elements.

A number of electrodes for fuel cell elements are known. The catalysts used for these electrodes are usually heavy metals compositions which are formulated and adjusted in accordance with the contemplated electrochemical reaction. These catalyst electrodes may be produced by various methods. For instance, a catalytically active metal is applied to a carrier, for instance, to a porous carbon body. Accordingly to another known method Raney alloys together with a supporting skeleton carrier are processed to electrodes. The electrodes are then activated by dissolving the inactive component of the Raney alloy thereby causing production of the porous structure.

Said known methods require considerable work and apparatus, and, therefore, are rather expensive. On the one hand it is necessary first to produce the porous carrier body. The catalyst solution must then be applied thereto, and finally must be reduced to the catalyst. Often this procedure must be repeated several times, to produce an electrode of sufficient activity.

On the other hand, when using Raney alloys, these alloys must first be produced separately by melting together the components of any desired specific catalyst composition. Subsequent activation which is usually carried out by a treatment with an alkali metal hydroxide solution is rather expensive due to the costs of the required chemicals and the time spend therefor.

Besides, the activated electrodes must be installed into fuel cell elements immediately after their manufacture or special precautions must be taken to prevent inactivation of the active layers by the action of atmospheric oxygen.

It has also been propsed to mold thermally decomposable compounds of catalyst metals such as, for instance, their hydroxides, nitrates, or carbonates, to form electrode bodies and subsequently to decompose said compounds to the catalytically active metals by heating to elevated temperature. Thereby, it is necessary to operate under predetermined, exact decomposition conditions in order to obtain reproducible results. It is possible to provide electrodes which are free of fissure and cracks only when carefully maintaining properly selected decomposition conditions.

It is also known that nickel or cobalt oxalates yield good hydrogenation catalysts after they have been reduced at elevated temperature when precipitating such oxalates in the presence of magnesium or zinc salts. Thereby, mixed oxalates of magnesium or zinc, on one hand, and nickel or cobalt, on the other hand, are obtained. The co-precipitated magnesium oxalate resp. zinc oxalate serves as a carrier since it is not changed on subsequent reduction. The high catalytic activity of the nickel catalyst is said to be due to its exceedingly fine distribution on the magnesium oxalate.

It is, furthermore, known to produce highly active nickel catalysts by jointly precipitating nickel formate together with alkaline earth formates and subsequently reducing the resulting precipitated mixture. Thereby, the unaffected alkaline earth metal formates serve as carrier material for the reduced nickel catalyst.

It is the primary object of the present invention to overcome the prior art's disadvantages in the production of highly active electrodes and to provide such electrodes.

It is another object of the present invention to provide porous double-layer catalyst electrodes containing at least two catalytically active metals which electrodes are especially useful for electrochemical devices and especially for fuel cell elements.

It is a further object of the present invention to provide a simple, effective, and inexpensive process for producing such porous, highly active, sintered, double-layer electrodes which is free of the disadvantages encountered heretofore.

Other objects of the present invention and advantageous features thereof will become apparent as the description proceeds.

In principle, the process according to the present invention comprises the following steps:

(a) At least two catalytically active metals are jointly prepared from a mixture of solutions of soluble salts of said metals in the form of reductible and/or readily heat-decomposable compounds or complex compounds, preferably by precipitation;

(b) the resulting compounds and/or complex compounds are decomposed by heating and/or are reduced to pyrophoric catalytically active metals;

(b1) treating said mixture with water until the mixture is non-pyrophoric;

(c) the resulting metallic catalyst mixture is then molded by pressure to the desired electrode body (d) and is sintered by heating said electrode body at a sintering temperature below about 500° C. in an inert or reducing atmosphere for at least half an hour.

The metallic catalyst mixture is preferably combined with a supporting skeleton material before molding and sintering.

It is highly surprising that the jointly precipitated and reduced and/or thermally decomposed catalytic metals possess a very high activity although they were not coprecipitated with the carrier material and reduced and/or thermally decomposed in the presence of said carrier material. It could not be expected or foreseen that such catalytically active metal mixtures would have a high catalytic activity although prepared in the absence of a carrier material which would assure the desired fine distribution and increased surface of the metallic catalyst.

The electrodes obtained according to the present invention are distinguished over other metallic catalyst electrodes by their excellent electrochemical load-carrying capacity. In addition thereto, said electrodes have a number of advantages over known electrodes. Their specific gravity is considerably lower than that of known double skeleton catalyst electrodes. Their weight is only between one half and two third of conventional sintered electrodes. They can be subject to about twice the load of known electrodes and at room temperature to a load of 600 ma./sq. cm. without any significant drop in potential. When treating the reduced catalyst with water for a short period of time, they can be stored in air without losing their activity and thus do not need reactivation or protection against atmospheric influences. In the production of oxygen electrodes for fuel cells it has been found to be especially advantageous to use silver as one of the metals to be precipitated and reduced. Of course, the production of fuel cell electrodes according to this invention is not limited to the use of silver but other catalyst compositions may also be employed therefor.

According to a preferred embodiment of the present invention the metallic catalyst is both pressed and subsequently sintered together with the supporting skeleton material. It is, however, also possible to place the catalyst, if required together with filler material between screens, sieves, nets, or the like to yield electrodes of the type of the so-called catalyst sieve electrodes, as for instance described in the U.S. Patent No. 3,121,031. It is, furthermore, possible to distribute the catalyst in the electrolyte as the electrochemically active part of fuel cell electrodes or oxidation electrodes, as fully described in U.S. Ser. No. 215,205, filed Aug. 8, 1962.

Surprisingly it has been found that considerably less favorable results, and especially a considerably lower load carrying capacity, are obtained when separately precipitating the catalytically active metals compounds, reducing them separately, but using them jointly, or respectively, even when jointly reducing intimate mixtures of the separately precipitated metal compounds.

Suitable metals for the manufacture of atmospheric oxygen electrodes are nickel, cobalt, and iron, if desired in combination with promoters such as, for instance, redox systems like cerium $^{III/IV}$ and manganese $^{II/IV}$.

The method according to the present invention is carried out by dissolving suitable salts of the catalytically active metals, preferably their nitrates, in a sufficient amount of a suitable solvent and adding thereto the precipitating agent, preferably in amounts of one to three moles, calculated for the metal mixture to be precipitated, while stirring vigorously. It is, however, also possible to add the solution of the metal salts to the precipitating agent. In may instances, it is advisable, especially when acids are used as precipitating agents, to employ the soluble salts of such acids, especially their alkali metal salts, or to neutralize the mixture after combining the reactants. To improve the yield, it is often of advantage to heat the reaction mixture for a short period of time while stirring. If a precipitaing agent is used which, when used in excess, forms soluble complex compounds with the catalyst metals, precipitation is best carried out with the calculated amount of reagent.

Suitable reagents for the joint precipitation of catalyst metals are, for instance, monovalent or polyvalent organic acids such as lower alkanoic acids, for instance, formic acid and acetic acid, lower aliphatic dicarboxylic acids, for instance, oxalic acid, malonic acid, succinic acid, lower aliphatic hydroxy carboxylic acids, for instance, tartaric acid and citric acid, phenyl dicarboxylic acids, for instance, phthalic acid, naphthenic acid, and others. Especially favorable results are obtained with oxalic acid and formic acid. The most suitable inorganic acid is carbon dioxide. In addition to such simple acids, it is also possible to precipitate the catalyst metals with polymeric, organic acids, for instance, with polyacrylic acid, or with basic reagents, for instance, with alkali metal hydroxide solutions. As mentioned before, it is of advantage to use the ammonium salts of the acids as precipitating agents in place of the acids themselves. Catalyst metals which tend to form carbides under the decomposition conditions are preferably precipitated in the form of their complex compounds, for instance, in the form of their ammonium complex compounds. It has also been found of advantage to neutralize the acid, before or after its mixture with the catalyst metal salt solution, at least to such an extent that the precipitation mixture reacts only weakly acid or neutral, whereby salts are formed.

A further advantageous embodiment of the process according to the present invention consists in precipitating the dissolved catalyst metals in the presence of finely divided or suspended metals which serve as supporting skeleton material when processing the catalysts to electrodes and which, at the same time, impart to such electrodes excellent electrical conductivity. In place of the above mentioned metallic carrier material, it is also possible to add finely divided or suspended metal oxides to the catalytic metal salt solution. Likewise, there may be added to the mixture of catalytic metal salts to be precipitated metal salts which form oxides under conditions used in the preparation of the metallic catalysts according to this invention and which are not reduced in the reducing atmosphere. Oxides which are not affected by the electrolyte have proved to be especially suitable. Alkaline earth metal salts the oxides of which can hardly be reduced may be added in the precipitation step.

Isolation of the mixture of catalytic metal compounds or complex compounds is achieved either by simple precipitation, in case difficutly soluble compounds or complex compounds are formed. If the resulting compounds or complex compounds are readily soluble, they are recovered, for instance, by concentration by evaporation, spray drying, salting out, and/or the addition of a solvent wherein they are less soluble or insoluble. In some cases they may be produced by melting together the components.

Water has proved to be the preferred solvent. In some instances organic solvents with a sufficient dissolving power for salts such as alcohols, acetonitrile, and formamides, if required, in mixture with water, may also be used.

The resulting precipitate of the catalytic metal compounds or complex compounds is filtered off by suction, washed, dried, and decomposed by heating at an elevated temperature in a reducing atmosphere to form the catalytically active metals. Especially good results are achieved by heating to temperatures between about 200° C. and about 700° C., preferably between about 300° C. and about 500° C., in the presence of hydrogen as reducing gas. Of course, it is possible to use inert gas mixtures containing hydrogen or other reducing gases. The decomposition and reduction temperature may be decreased by prolonging the reaction time.

The reduced metallic catalysts are suitably cooled in an inert gas atmosphere or a reducing atmosphere. The thus produced strongly pyrophoric metallic catalyst is then treated with water whereby hydrogen evolves. The catalyst is then dried and can be stored with exposure to the atmosphere for any length of time.

The metallic catalyst is intimately mixed with a suitable supporting skeleton material, for instance, carbonyl nickel or molecular silver. The mixture is molded under pressure and sintered. For molding a pressure of about 1 ton/sq. com. is usually sufficient. Sintering is effected at a temperature of about 450° C. in an inert or reducing atmosphere.

It is of advantage to use sifted catalyst material so as to obtain uniform pore structure. For instance, when preparing double layer electrodes, a particle size of the metallic catalyst mixture between about 40μ and about 70μ is used for the working layer while the covering layer is prepared from particles of a particle size less than 40μ, for instance, 10μ and the supporting skeleton material from particles of a particle size of about 60μ. In some instances it is of advantage to admix to the working layer small amounts of expanding agents such as ammonium carbonate or soluble filler materials which serve as preforming agents without expanding effect and which are subsequently dissolved from the electrode body.

The following examples serve to illustrate the present invention without, however, limiting the same thereto.

EXAMPLE 1

(a) Preparation of the catalyst mixture 16.9 g. of nickel nitrate ($Ni(NO_3)_2 \cdot 6H_2O$) corresponding to 3.4 g. of metallic nickel and 2.6 g. of silver nitrate ($AgNO_3$) corresponding to 1.6 g. of silver are dissolved in 2000 cc. of water. 88 cc. of an aqueous 10% oxalic acid solution corresponding to the theoretically required amount are added thereto at room temperature while stirring vigorously. The mixture is neutralized by the addition of a diluted aqueous potassium hydroxide solution thereby disregarding the precipitate which may have formed. To complete precipitation, the solution is heated to boiling while stirring continuously. After cooling, the jointly precipitated oxalates are filtered off by suction and washed with a small amount of ice-water. The filter cake is coarsely comminuted and dried.

The jointly precipitated and dried oxalates are reduced to the corresponding metals by exposure to a hydrogen atmosphere at a temperature between 350° C. and 400° C. The resulting highly pyrophoric metal powder is cooled in a hydrogen stream and is introduced into water. Thereby, copious hydrogen evolution takes place. The catalyst is filtered off by suction, dried at 105° C. in a drying oven, and subjected to air classification.

(b) Manufacture of the catalyst electrode

A double layer catalyst electrode is produced by mixing 3 parts, by weight, of silver powder of a particle size of less than $40\mu$ and 1 part, by weight, of the catalyst powder obtained as described under (a) of a particle size between $5\mu$ and $10\mu$ to form the covering layer and 2 parts, by weight, of silver powder of a particle size less than $40\mu$, 1 part, by weight, of the catalyst powder of a particle size between $40\mu$ and $70\mu$ and 0.5 part, by weight, of ammonium carbonate of a particle size of less than $40\mu$ to form the working layer. 2 parts of the covering layer mixture and 17 parts of the working layer mixture are molded to a double-layer catalyst electrode by exposure to a pressure of 1 ton/sq. cm. The molded electrode body is then sintered at a temperature of 450° C.

An electrode produced in this manner is installed as oxygen electrode in a half element with 6 N potassium hydroxide solution as electrolyte. The potential of the electrode is measured under various loads opposite to a saturated calomel electrode. Curve $a$ of the attached FIG. 1 illustrates the potential for various working temperatures.

EXAMPLE 2

Figure 2:
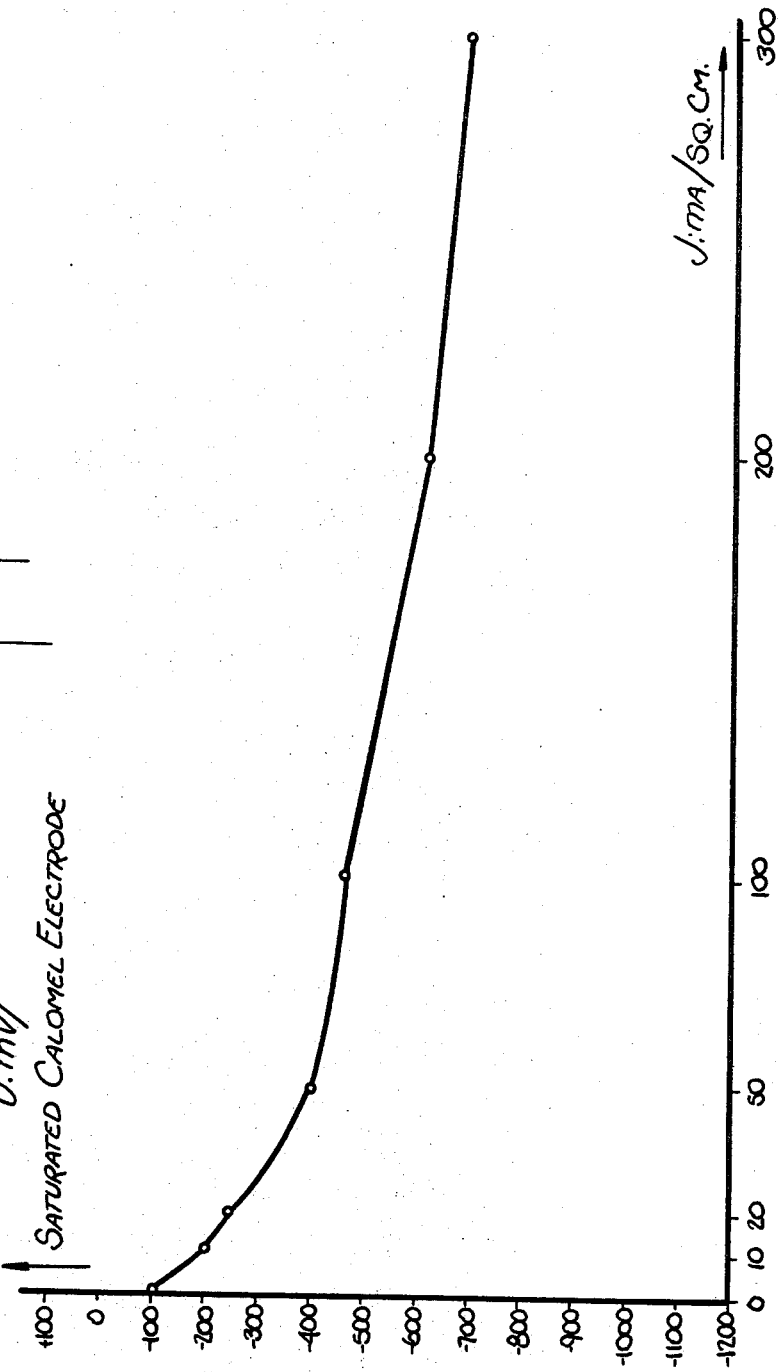

In contrast to Example 1, there is used nickel carbonyl powder of a particle size beween $5\mu$ to $10\mu$ in place of the silver powder, while otherwise the procedure and amounts of metallic catalyst mixture, supporting nickel carbonyl powder, and ammonium carbonate in the covering layer and the working layer are the same as given in said Example 1. The thus prepared double-layer catalyst electrode is installed as oxygen electrode in a half element device under an oxygen pressure of 1 atm. gauge and at a temperature of 31° C. The potential of this electrode is measured against a saturated calomel electrode for various loads. The discharge voltage curve of such an electrode is shown in FIG. 2.

EXAMPLE 3

The electrode which has previously been used as oxygen electrode as described in Example 1 is inserted immediately thereafter as hydrogen electrode in a half element device. Adjustment to the theoretical hydrogen potential takes place very rapidly. The electrode can be subjected to a load up to 50 ma./sq. cm. at room temperature.

EXAMPLE 4

A metallic catalyst according to the present invention is prepared by dissolving 3.3 g. of silver nitrate ($AgNO_3$) corresponding to 2.1 g. of silver, 34.1 g. of nickel nitrate ($Ni(NO_3)_2 \cdot 6H_2O$) corresponding to 6.9 g. of nickel, and 1.6 g. of ferrous nitrate ($Fe(NO_3)_2 \cdot 6H_2O$) corresponding to 0.3 g. of iron, in 3200 cc. of water, precipitating the respective metal oxalates by the addition of 165 cc. of an aqueous 10% oxalic acid solution, and working up the precipitate to the catalytically active metals by following the procedure described in Example 1.

The thus prepared double-layer catalyst electrode is used as oxygen electrode in a half element device under an oxygen pressure of 1.6 atm. gauge and at a temperature of 19° C. The discharge voltage curve of the electrode is shown in FIG. 3. The discharge voltage curve of such an electrode is determined opposite to a saturated calomel electrode.

EXAMPLE 5

2.6 g. of silver nitrate ($AgNO_3$) corresponding to 1.6 g. of silver are dissolved in 700 cc. of water and 10 cc. of an aqueous 10% oxalic acid solution are added thereto at room temperature while stirring vigorously. The solution is neutralized by the addition of a dilute aqueous solution of potassium hydroxide to precipitate silver oxalate. To complete precipitation, the mixture is heated to boiling while stirring continuously.

16.9 g. of nickel nitrate ($Ni(NO_3)_2 \cdot 6H_2O$) are dissolved in 1400 cc. of water and 78 cc. of an aqueous 10% oxalic acid solution is added thereto at room temperature while stirring vigorously. The solution is neutralized by the addition of a dilute aqueous solution of potassium hydroxide to precipitate nickel oxalate. To complete precipitation, the mixture is heated to boiling while stirring continuously.

The two separate precipitates of silver oxalate and nickel oxalate are then combined, reduced, and molded to a double-skeleton catalyst electrode corresponding to that obtained according to Example 1. Such an electrode can be subjected to a much lower load than the electrode prepared according to Example 1 under the same conditions. The results of the discharge voltage curve of such an electrode are illustrated by curve (b) of FIG. 1.

This comparative test clearly proves that simultaneous precipitation of silver and nickel oxalates and subsequent conversion of the mixture to a metallic catalyst electrode produces a much more effective electrode as separate precipitation of silver and nickel oxalates followed by mixing the separately precipitated oxalates and processing the mixture to a metallic catalyst electrode.

EXAMPLE 6

50 g. of granulated silver are dissolved in the stoichiometric quantity of hot nitric acid. Additionally 50 g. of carbonyl-nickel powder are brought into solution with a stoichiometric amount of nitric acid. Both solutions are then filtered and combined. After dilution of the combined solution with water to about 2000 cc. and heating up a stoichiometric amount of formic acid (10 percent by weight) is added under continuous agitation of the solution. Nickel and silver are precipitated as formates simultaneously. In order to ensure completeness of precipitation the solution is neutralised by the addition of dilute aqueous potassium hydroxide.

The precipitate is then thoroughly washed with cold water and after drying at 105° C. in air in a drying chamber, the formates are reduced to a finely divided mixture of the respective metals by heating the formates in a protective hydrogen atmosphere for one hour at 350° to 450° C. The resulting catalyst being highly pyrophoric too has to be transferred immediately after reduction into water. Manufacturing conditions of electrodes, i.e., ratio of mixing of components, pressing and sintering parameters are strictly identical with those described in Example 1.

EXAMPLE 7

(a) Manufacturing of catalyst 40 g. of granulated silver, 57 g. of carbonyl-nickel powder and 3 g. of copper powder are dissolved as previously described in Example 6, however, nitric acid in methanolic solution (50 percent by weight conc. nitric acid plus 50 percent by weight methyl alcohol) is employed. The respective metals are precipitated as succinic salts by the addition of a stoichiometric quantity of a 5 percent by weight solution of succinic acid in alcohol. During the addition of the succinic solution good agitation by stirring must be ensured. After completion of the precipitation the liquid is separated from the precipitate by means of suction. The resulting simultaneously precipitated salt mixture of the succinic acid is subsequently washed several times with alcohol, dried and reduced in the presence of hydrogen gas as previously described (Example 6). The metal powder catalyst, thus prepared, again is very pyrophoric. However, after being treated with water, the catalyst can be stored in air.

(b) Manufacturing of electrodes (1) Cover layer.—1 part by weight of catalyst powder of a particle size between $7\mu$ and $15\mu$, is thoroughly mixed with 1.8 parts by weight of carbonyl-nickel powder (commercial grade "A").

(2) Working layer.—1 part by weight of catalyst powder, 1.5 parts by weight of carbonyl-nickel powder (commercial grade "L"/0.5) and 0.3 part by weight of ammonium carbonate powder with a particle size between $20\mu$ and $40\mu$, are thoroughly mixed.

(3) Manufacturing parameters.—For the manufacture of an electrode, 80 mm. in diameter and 4 mm. in thickness, 12 g. of the powder for the cover layer are uniformly filled in the press-matrix. Then 70 g. of the powder of the working layer are filled into the same matrix and the two layers are compressed with 1 ton/sq. cm. The resulting disc shaped body after mounting in a sintered jig is subsequently sintered in hydrogen gas, a protective atmosphere, at 500° C. for half an hour. An electrode thus manufactured has been used as an oxygen electrode in an electrical arrangement known as "half-cell" connection. The electrolyte employed was 6 normal KOH. The potential of the electrode was measured against a standard saturated Calomel Reference Electrode. The results of these measurements for various temperatures as parameters are presented in FIG. 4.

EXAMPLE 8

35 g. of granulated silver and 60 g. of carbonyl-nickel powder are dissolved in a stoichiometric amount of nitric acid as described in Example 6. To the resulting mixtures of the metal nitrates 15.5 g. of cerium(3)-hexahydrate are added. After the cerium salt has been dissolved, a 10% solution of potassium carbonate is gradually added, the solution being vigorously agitated by stirring. The solution is then brought to the boiling point. After cooling the simultaneously precipitated carbonate mixture of the respective metals is filtered off and the precipitate washed with cold water. After drying the precipitate the mixture reduced in $H_2$-atmosphere at 450° C. for the final preparation of the catalyst.

EXAMPLE 9

80 g. of silver nitrate and 250 g. of nickel nitrate are dissolved in 1000 cc. of water. For precipitation an aqueous solution of acrylic acid, 10% by weight, is gradually added to the metal nitrate solution under vigorous stirring. The precipitate simultaneously formed is filtered off, washed with cold water and the metal acrylates reduced in the presence of a protective hydrogen atmosphere at 400–450° C.

Manufacture of electrodes is identical with that described in Example 7.

EXAMPLE 10

40 g. of granulated silver and 45 g. of carbonyl-nickel powder are separately dissolved in a stoichiometric quantity of nitric acid. After filtration and mixing of the two solutions 79 g. of maganese(2)-nitrate hexahydrate are added. On completion of the dissolution of the manganese salt a stoichiometric amount of a 15% by weight aqueous solution of potassium formate is slowly added keeping the solution well stirred. By evaporation most of the water is removed. To the precipitate 400 ml. of acetone are added and the solution stirred up well. After filtration further washing with acetone is applied. Reduction in hydrogen gas at 350 to 400° C. is then followed. The resulting catalyst is extremely pyrophoric and has to be transferred into water immediately the reduction procedure is finished, rendering the catalyst after this water treatment non-pyrophoric.

EXAMPLE 11

40 g. of granulated silver and 60 g. of granulated cobalt powder are separately brought into solution by a stoichiometric amount of nitric acid. After mixing both of these nitrate solutions 20 g. of finely divided aluminium oxide (diaspore: $Al_2O_3 \cdot H_2O$ or hydrargillite: $Al_2O_3 \cdot 3H_2O$)

are added and a suspension is prepared by vigorous agitation. Then a 2% by weight solution of sodium oxalate is slowly added in stoichiometric quantity; the vigorous stirring is kept up during this procedure. In order to ensure quantitative precipitation of the oxalates an addition of dilute NaOH is made until the solution has attained a pH equal to 7. The precipitation of the metal oxalates occurs preferentially on the surface of the suspended aluminium oxide particles. Filtration, washing with cold water and drying at 105° C. follows, as described in previous examples. The final production of the catalyst is accomplished by reduction of the dry resulting powder in a protective atmosphere of hydrogen at 350 to 400° C.

EXAMPLE 12

35 g. of granulated silver and 50 g. of carbonyl-nickel powder are separately dissolved in a stoichiometric amount of nitric acid. After filtration and mixing both these solutions 88 grams of calcium nitrate tetrahydrate are added and dissolved. By vigorously stirring the solution a stoichiometric quantity of oxalic acid (5% by weight) is gradually added. In order to make sure that the simultaneous precipitation of the resulting metal oxalates is complete a neutralisation of the solution with dilute NaOH to a pH=7 follows.

The precipitate thus formed is filtrated, washed with cold water, dried at 105°–110° C. and subsequently reduced in a hydrogen atmosphere at temperature of 350 to 400° C.

The electrode manufacture is identical with that described in Example 6.

EXAMPLE 13

40 g. of granulated silver, 55 g. of carbonyl-nickel powder and 5 g. of copper powder are separately dissolved in a stoichiometric amount of nitric acid. After filtration and mixing of the three solutions aqua dest. is added until the total volume of the solution is about two liters. Then 15 g. of barium sulfate in finely divided form are suspended in the solution by vigorous agitation or stirring. A solution comprising 10% by weight of aqueous formic acid is slowly added. A simultaneous precipitation of the respective metal formates on the barium sulfate particles is formed by this procedure. To ensure complete precipitation the solution is then neutralised with dilute aqueous sodium hydroxide.

Reduction at 350–400° C. is subsequently achieved in an atmosphere of hydrogen. The manufacture of electrodes is strictly identical with that described in Example 7.

EXAMPLE 14

(a) Production of catalyst 20 g. of granulated silver, 50 g. of carbonyl-nickel powder, 10 g. of cobalt carbonyl powder, 4 g. of copper powder and 2 g. of palladium in form of strips are separately dissolved in stoichiometric quantities of nitric acid. After filtration of each of these solutions and mixing to the resulting clear solution, 60 g. of calcium nitrate tetrahydrate and 10 g. of thorium nitrate hexahydrate is added and dissolved. The solution is then diluted to about 2 liters and under vigorous stirring a stoichiometric quantity of oxalic acid (5% by weight) is gradually added.

The resulting intimate mixture of metal oxalates is precipitated to completeness by neutralising the solution with a proper amount of dilute potassium hydroxide solution. After filtration, washing with cold water and drying at 105–110° C. the precipitate is reduced at 350 to 450° C. in a protective atmosphere of hydrogen. By this procedure Ag, Ni, Co, Cu and Pd of the simultaneously precipitated oxalate salt mixture are formed in a finely divided metallic state whilst calcium oxide and thorium oxide in finely divided form act as catalyst carriers. In addition these oxides are excellent promotors for the electrochemical catalytic reactions.

(b) Production of electrodes (1) Cover layer.—1 part by weight of catalyst powder with a particle size of about 15μ are thoroughly mixed with an intimate mixture of 0.3 part by weight silver powder (less than 20μ) and 0.7 part by weight nickel carbonyl powder (grade "A").

(2) Working layer.—1 part by weight of catalyst material, 40–60 microns, are thoroughly mixed with 1.5 parts by weight of an intimate mixture consisting of 30% by weight of silver powder (less than 20μ), 70% by weight of nickel carbonyl powder (grade L–0.5) and 0.3 part by weight of ammonium carbonate (less than 40μ).

(3) Parameters of production.—In complete accordance with Example 7.

We claim:

1. In a process of producing a highly catalytically active electrode which contains at least two catalytically active metals, one of which is silver, said metals being sintered with a metal skeleton powder to an electrode body, the steps which comprise;
    coprecipitating a mixture of reducible metal compounds from a solution containing soluble salts of at least two catalytically active metals,
    adding to said solution prior to the termination of the coprecipitation said metal skeleton powder,
    reducing said mixture under a reducing atmosphere to a mixture of particles of at least two catalytically active metals, of which at least one is pyrophoric,
    treating said mixture of particles of metal catalysts with water until it is non-pyrophoric, and
    molding and sintering said mixture of particles which comprises the catalytically active metals and said metal skeleton powder into an electrode body.

2. In a process of producing a highly catalytically active electrode which contains at least two catalytically actively metals, one of which is silver, said metals being sintered with a metal skeleton powder to an electrode body, the steps which comprise;
    coprecipitating a mixture of reducible metal compounds from a solution containing soluble salts of at least two catalytically active metals,
    reducing said mixture under a reducing atmosphere to a mixture of particles of at least two catalytically active metals, of which at least one is pyrophoric,
    treating said mixture of particles of metal catalysts with water until it is non-pyrophoric, and
    molding and sintering the resulting mixture of particles which comprises the catalytically active metals and said metal skeleton powder into an electrode body, said metal skeleton powder being combined with the metallic catalyst mixture prior to molding and sintering.

3. The process of claim 1 in which the co-precipitation is carried out in the absence of a metal oxide.

4. The process of claim 1 in which the coprecipitation is carried out in the presence of a metal oxide.

5. The process of claim 1 in which the mixture of reducible metal compounds which includes powdered metal skeleton is dried prior to the reduction step.

6. The process according to claim 1, wherein the catalytically active metals are metals selected from the group consisting of nickel, cobalt, iron, and silver and said metals promoted with $cerium^{III/IV}$ or $manganese^{II/IV}$.

7. The process of claim 1 in which the catalytically active metals are silver and nickel.

8. The process of claim 1 in which said metal skeleton powder is silver.

9. The process of claim 1 in which said metal skeleton powder is carbonyl-nickel.

10. The process of claim 1 in which in addition to said metal skeleton powder, the mixture of particles includes a metal oxide.

11. The process of claim 1 in which the reducing temperature is maintained in the range of about 300 to 400° C.

12. The process of claim 1 in which the sintering temperature is not higher than about 500° C.

References Cited

UNITED STATES PATENTS

| | | | |
|---|---|---|---|
| 3,206,338 | 9/1965 | Miller et al. | 75—123 |
| 1,829,635 | 10/1931 | Davey | 75—211 |
| 3,073,697 | 1/1963 | Friese et al. | 75—208 |
| 3,097,115 | 7/1963 | Moos | 136—120 |

FOREIGN PATENTS

| | | |
|---|---|---|
| 536,035 | 1/1957 | Canada. |
| 806,644 | 12/1958 | Great Britain. |

WINSTON A. DOUGLAS, *Primary Examiner.*

C. F. LeFevour, *Assistant Examiner.*

U.S. Cl. X.R.

136—86